(12) United States Patent
Kim

(10) Patent No.: US 9,333,935 B2
(45) Date of Patent: May 10, 2016

(54) AIRBAG DEPLOYMENT AUXILIARY MEMBER AND CURTAIN AIRBAG DEVICE

(71) Applicant: Autoliv Development AB, Vårgårda (SE)

(72) Inventor: Minhun Kim, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 14/420,908

(22) PCT Filed: Aug. 12, 2013

(86) PCT No.: PCT/JP2013/071828
§ 371 (c)(1),
(2) Date: Feb. 11, 2015

(87) PCT Pub. No.: WO2014/027645
PCT Pub. Date: Feb. 20, 2014

(65) Prior Publication Data
US 2015/0217715 A1   Aug. 6, 2015

(30) Foreign Application Priority Data
Aug. 14, 2012  (JP) .................................. 2012-179918

(51) Int. Cl.
*B60R 21/213*  (2011.01)
*B60R 21/232*  (2011.01)
(Continued)

(52) U.S. Cl.
CPC ............. *B60R 21/213* (2013.01); *B60R 21/232* (2013.01); *B60R 21/237* (2013.01); *B60R 21/2334* (2013.01); *B60R 2021/161* (2013.01)

(58) Field of Classification Search
CPC ................ B60R 21/232; B60R 21/213; B60R 2021/161; B60R 21/215
See application file for complete search history.

(56) References Cited

U.S. PATENT DOCUMENTS 5,992,914 A  * 11/1999  Gotoh ................. B60R 13/0206
                                                            280/751
6,170,861 B1 *  1/2001  Tietze ..................... B60R 21/04
                                                            280/728.2
(Continued)

FOREIGN PATENT DOCUMENTS

BR      199710403 A    8/1999
CA      2 242 339 A1   5/1998
(Continued)

OTHER PUBLICATIONS

Japanese Patent Office, International Search Report of International Application No. PCT/JP2013/071828, Mailed on Nov. 5, 2013, 2 pages.

*Primary Examiner* — Paul N Dickson
*Assistant Examiner* — Timothy Wilhelm
(74) *Attorney, Agent, or Firm* — Brinks Gilson & Lione

(57) ABSTRACT

An airbag deployment assistance member capable of suppressing a variation in rotation amount during airbag deployment and increasing stability of an airbag deployment direction. The airbag deployment assistance member includes an attachment portion attached to a body of a vehicle (V), a holding portion that holds a curtain airbag in a folded state on the inner side, and a hinge portion that connects one end of the attachment portion and a first portion of the holding portion. During deployment of the curtain airbag, the entire holding portion rotates about the hinge portion by the deployment force of the curtain airbag until an outer portion of the first portion makes contact with portions of the attachment portion close to an interior garnish. After the contact, a second portion of the holding portion is allowed to be deformed so as to be open in relation to the first portion.

9 Claims, 16 Drawing Sheets

(51) Int. Cl.
  *B60R 21/2334* (2011.01)
  *B60R 21/237* (2006.01)
  *B60R 21/16* (2006.01)

(56) References Cited

U.S. PATENT DOCUMENTS

| | | | |
|---|---|---|---|
| 6,217,061 B1 * | 4/2001 | Harland | B60R 21/04 280/730.2 |
| 6,234,517 B1 * | 5/2001 | Miyahara | B60R 21/04 280/730.2 |
| 6,333,515 B1 | 12/2001 | Kubota et al. | |
| 6,357,812 B1 * | 3/2002 | Adachi | B60R 13/025 280/748 |
| 6,530,594 B1 * | 3/2003 | Nakajima | B60R 21/213 280/728.2 |
| 6,793,241 B2 * | 9/2004 | Wallner | B60R 21/213 24/455 |
| 7,481,448 B2 * | 1/2009 | Heigl | B60R 21/213 280/728.2 |
| 7,621,559 B2 * | 11/2009 | Seong | B60R 21/213 280/730.2 |
| 7,654,559 B2 * | 2/2010 | Hidaka | B60R 21/213 280/728.2 |
| 7,677,593 B2 * | 3/2010 | Downey | B60R 13/0206 280/728.2 |
| 7,828,321 B2 * | 11/2010 | Bakhsh | B60R 21/232 280/730.2 |
| 2002/0024202 A1 | 2/2002 | Kubota et al. | |
| 2003/0209891 A1 | 11/2003 | Kubota et al. | |

FOREIGN PATENT DOCUMENTS

| | | |
|---|---|---|
| DE | 697 29 178 T2 | 6/2005 |
| DE | 697 32 261 T2 | 12/2005 |
| EP | 0 872 390 A1 | 10/1998 |
| EP | 1 232 912 A1 | 8/2002 |
| ES | 2 221 041 T3 | 12/2004 |
| ES | 2 236 383 T3 | 7/2005 |
| JP | 2001-39259 A | 2/2001 |
| JP | 2001-39260 A | 2/2001 |
| JP | 2002-19565 A | 1/2002 |
| JP | 2010-137753 A | 6/2010 |
| JP | 2012-148595 A | 8/2012 |
| WO | 98/19893 A1 | 5/1998 |

* cited by examiner

PRIOR ART

AIRBAG DEPLOYMENT AUXILIARY MEMBER AND CURTAIN AIRBAG DEVICE

BACKGROUND

1. Field of the Invention

The present invention relates to an airbag deployment assistance member that assists the deployment of a curtain airbag of an airbag device equipped in a vehicle and to a curtain airbag device having the airbag deployment assistance member.

2. Description of Related Art

As an airbag deployment assistance member of this type, an envelope member as disclosed in Japanese Patent Application Publication No. 2010-137753 is conventionally known. As illustrated in FIG. 11 of the present application, the envelope member 40 includes an edge portion 40b attached to an A-pillar and a body portion 40' having a C-shaped cross-section extending from one end of the edge portion 40b. The envelope member 40 holds a curtain airbag 21 that is folded inside the body portion 40'. Since the body portion 40' has a plurality of protruding portions disposed close to an A-pillar trim, the body portion 40' has higher rigidity than the edge portion 40b. As a result, when deployment force of the curtain airbag 21 is applied, the body portion 40' rotates clockwise about a bent portion 40x that connects the edge portion 40b and an edge portion 40a. With this rotation, an edge portion 40c of the body portion 40' is oriented toward the backward side slightly further than a rear edge of the A-pillar trim and the deployment of the curtain airbag 21 is guided in the orientation direction.

However, the envelope member 40 is configured such that the rotation of the body portion 40' is not restricted during airbag deployment. Due to this, in some cases when the airbag is deployed, a rotation amount of the body portion 40' varies and an airbag deployment direction in which the body portion 40' is oriented also varies.

Moreover, when the airbag is deployed, the airbag deployed may be caught at an interior garnish and the interior garnish may be broken.

SUMMARY

Therefore, an object of the present invention is to suppress a variation in rotation amount of an airbag deployment assistance member during airbag deployment and to enhance stability of an airbag deployment direction.

Another object of the present invention is to prevent a deployed airbag from being caught at an interior garnish and prevent breakage of the interior garnish, and further to prevent an associated delay in airbag deployment.

In order to attain the objects, according to an aspect of the present invention, there is provided an airbag deployment assistance member including: an attachment portion attached to a body of a vehicle; a holding portion having a first portion that extends from one end of the attachment portion toward an interior garnish, and a second portion that extends from an end portion of the first portion close to the interior garnish and holds a curtain airbag in a folded state the an inner side together with the first portion; and a hinge portion that connects one end of the attachment portion and the first portion, wherein, during deployment of the curtain airbag (hereinafter sometimes referred to as during airbag deployment), the entire holding portion rotates about the hinge portion by deployment force of the curtain airbag until an outer portion of the first portion makes contact with a portion of the attachment portion close to the interior garnish, and after the contact, the second portion is allowed to be deformed so as to be open in relation to the first portion.

According to another aspect of the present invention, there is provided a curtain airbag device including the airbag deployment assistance member.

According to the present invention, the rotation of the entire holding portion during airbag deployment is restricted when the outer portion of the first portion of the holding portion makes contact with the portion of the attachment portion close to the interior garnish. Due to this, it is possible to make a rotation amount of the airbag deployment assistance member during airbag deployment constant. Further, since the start of such deformation of the second portion as to be open in relation to the first portion is allowed after the rotation of the holding portion is restricted, the curtain airbag can be deployed in a state where there is no variation in the rotation amount of the holding portion. In this manner, since the airbag deployment assistance member is configured to be deformed in two steps during the airbag deployment, it is possible to suppress troubles resulting from the variation and to stabilize the deployment direction of the curtain airbag. Further, since the force applied to the interior garnish by the deployed airbag is appropriately distributed during the airbag deployment, the interior garnish is not deformed inappropriately and is rarely broken. Furthermore, since the interior garnish is deformed, as designed, during airbag deployment, a delay in deployment of the airbag or the like can be prevented.

Preferably, the portion of the attachment portion close to the interior garnish with which the outer portion of the first portion makes contact is a protruding portion that protrudes toward the interior garnish.

By so doing, it is possible to restrict rotation of the entire holding portion during airbag deployment while increasing the rigidity of the attachment portion with a simple structure.

More preferably, at least two protruding portions are provided in an extension direction of the curtain airbag.

According to such a configuration, since rotation of the entire holding portion during the airbag deployment is restricted at least at two positions, it is possible to restrict the rotation of the entire holding portion in a well-balanced manner and to improve the stability of the deployment direction.

More preferably, the attachment portion has a clip portion that protrudes toward a side opposite the interior garnish and is detachably attached to the body of the vehicle, and the at least two protruding portions are disposed on front and rear sides of the vehicle when seen from the clip portion.

If the clip portion and one protruding portion are disposed to be offset in the front-rear direction of the vehicle, the attachment portion may rotate about the clip portion during the airbag deployment. According to the aspect of the present invention, since two protruding portions are disposed with the clip portion interposed, it is possible to suppress the rotation of the attachment portion and to improve the stability of the deployment direction.

Preferably, the hinge portion is formed by thinning a portion that connects one end of the attachment portion and the first portion.

By so doing, it is possible to form the hinge portion easily.

Preferably, a force transmitting portion that transmits the deployment force of the curtain airbag to the interior garnish so as to open the interior garnish is provided in the second portion.

According to this configuration, the load and impact acting on the interior garnish is relieved as compared to when the deployment force of the curtain airbag is transmitted directly to the pillar trim. As a result, it is possible to suppress damage of the interior garnish.

Preferably, a bead that connects inner portions of the first and second portions is formed in a portion that connects the first and second portions.

According to this configuration, since the rigidity of the portion that connects the first and second portions is enhanced, it is possible to suppress both the first and second portions from starting to be deformed from this connecting portion. Moreover, since the bead is formed in the inner portion of the holding portion, it is possible to easily avoid interference between the interior garnish and a rib which is formed on the outer portion of the holding portion.

The interior garnish can be applied to a pillar trim or a roof side inner garnish, for example.

DETAILED DESCRIPTION

Hereinafter, a preferred embodiment of the present invention will be described with reference to the accompanying drawings.

Figure 1A:
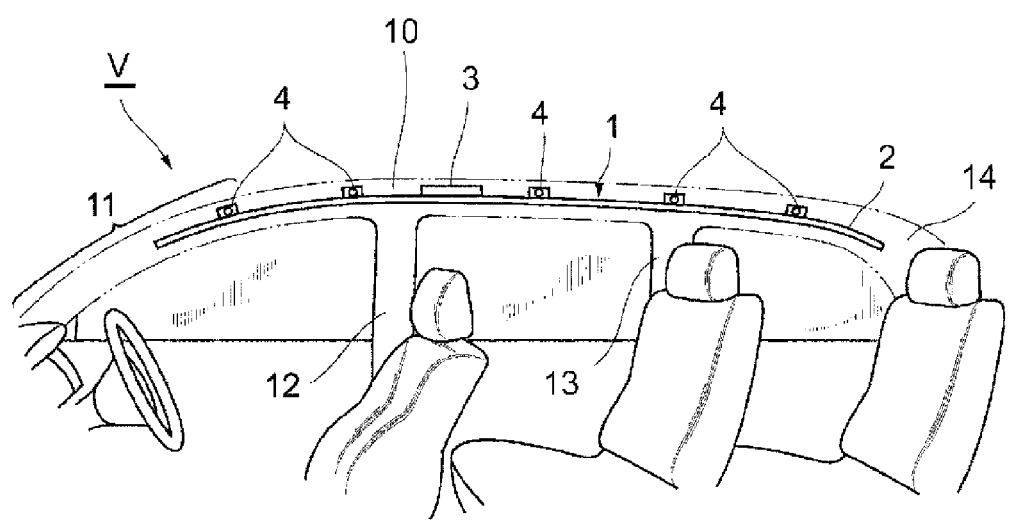
FIG. 1A is a schematic perspective view as seen from the interior side, illustrating a state where an airbag device is attached to the right side in a travelling direction of a vehicle.
Figure 1B:
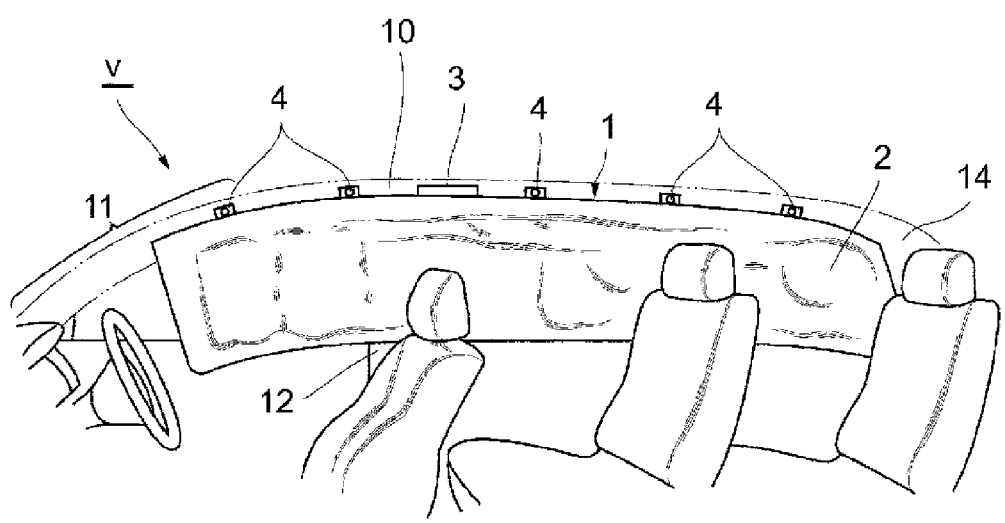
FIG. 1B is a schematic perspective view illustrating a state where the airbag device is operated to deploy a curtain airbag from the state of FIG. 1A.

As illustrated in FIGS. 1A and 1B, an airbag device 1 is a curtain airbag device that deploys a curtain airbag 2 toward a side near the windows of a vehicle V. The airbag device 1 is stored above a side surface of a vehicle cabin and is attached to a roof side rail 10 of the vehicle V. A plurality of pillars is provided in the vehicle V as an A-pillar 11, a B-pillar 12, a C-pillar 13, and a D-pillar 14 in that order from the front side. In the present embodiment, the roof side rail 10 is provided between the A-pillar 11 and the D-pillar 14 so as to be continuous thereto. The interior side of the A-pillar 11, the B-pillar 12, the C-pillar 13, and the D-pillar 14 is covered by a pillar trim (see an A-pillar trim 30 of FIG. 2) molded with a resin or the like. Moreover, the interior side of the roof side rail 10 is covered by a top sealing formed with a resin or the like. The pillar trim and the top sealing are examples of interior garnishes and form the interior material of the vehicle cabin. The airbag device 1 extends from the A-pillar 11 to the D-pillar 14 and is arranged in a state of being covered by the pillar trim and the top sealing from the interior side. The A-pillar 11, the roof side rail 10, and the D-pillar 14 are formed by welding a plurality of panel members to have a closed cross-section, and the airbag device 1 is attached to an inner panel which is one of the interior-side panel members.

The airbag device 1 includes the curtain airbag 2 and an inflator 3 that supplies inflation gas to the curtain airbag 2. The curtain airbag 2 in a folded state is arranged in the interior side along the A-pillar 11, the roof side rail 10, and the D-pillar 14. The curtain airbag 2 is formed in a bag shape by sewing woven fabrics or the like at an appropriate position and is deformed from a folded state to a deployed state when inflation gas is supplied. The curtain airbag 2 in the folded state may have a roll shape and may have an accordion shape or a combination thereof. Moreover, the curtain airbag 2 has a plurality of tabs 4 which is not bag-shaped and is attached to the respective inner panels of the A-pillar 11, the roof side rail 10, and the D-pillar 14 with the tabs 4 interposed. When inflation gas is generated by the inflator 3 and is supplied to the curtain airbag 2 in the event of a side collision or a rollover of the vehicle V, the curtain airbag 2 pushes and opens the pillar trim and the top sealing and is deployed inside the vehicle cabin in a curtain form along a side window from the gap between the pillar trim and the top sealing and the body of the vehicle V.

Figure 2:
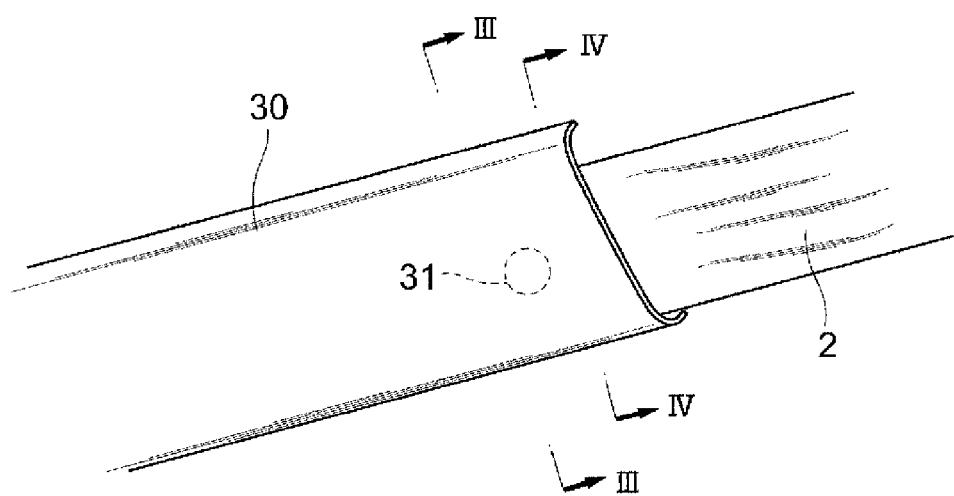
FIG. 2 is a view as seen from the interior side of a vehicle, illustrating the portions near the boundary between an A-pillar trim and a top sealing while illustrating an upper end of the A-pillar trim and a portion of the curtain airbag at an enlarged scale.

FIG. 2 is a view illustrating the portions near the boundary between the A-pillar trim 30 and the top sealing while illustrating an upper end of the A-pillar trim 30 and a portion of the curtain airbag 2 at an enlarged scale. The A-pillar trim 30 is configured to cover the A-pillar 11 from the interior side and is provided so that the upper end is near the top sealing (not illustrated). The A-pillar trim 30 is one of interior garnishes, which is also referred to as a front pillar garnish.

Figure 3:
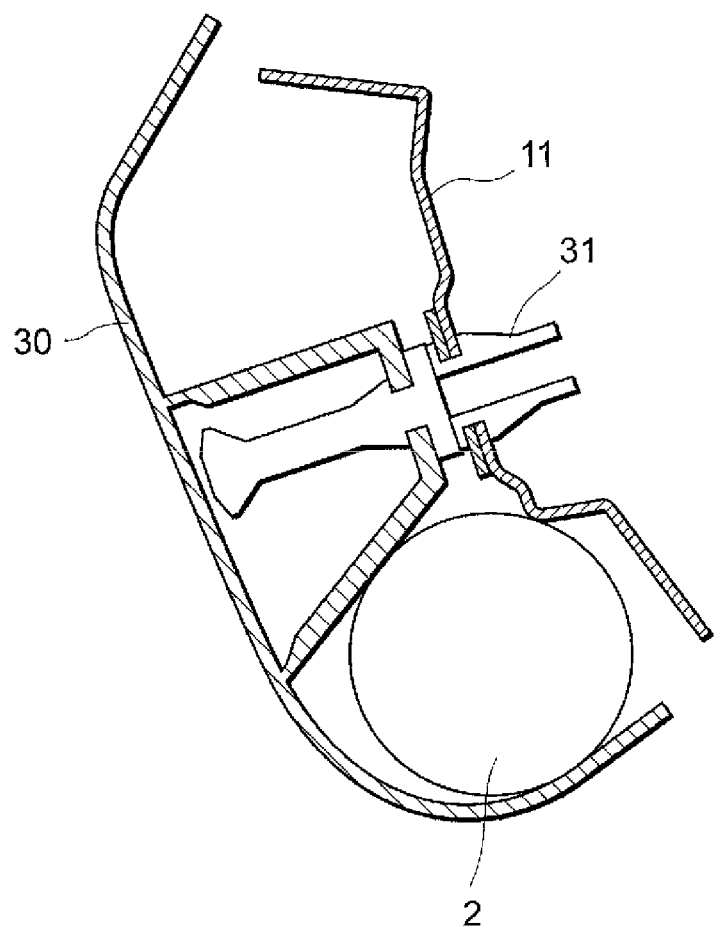
FIG. 3 is a cross-sectional view taken along line III-III in FIG. 2.

As illustrated in FIG. 3, the A-pillar trim 30 has a clip 31 provided so as to protrude toward the A-pillar 11. The clip 31 passes through a hole formed in the inner panel of the A-pillar 11, whereby the A-pillar trim 30 is attached to the A-pillar 11. Such a clip 31 is also provided on the lower side of the A-pillar 11 and the A-pillar trim 30 is attached to the A-pillar 11 at least at one upper position and one lower position.

Figure 4:
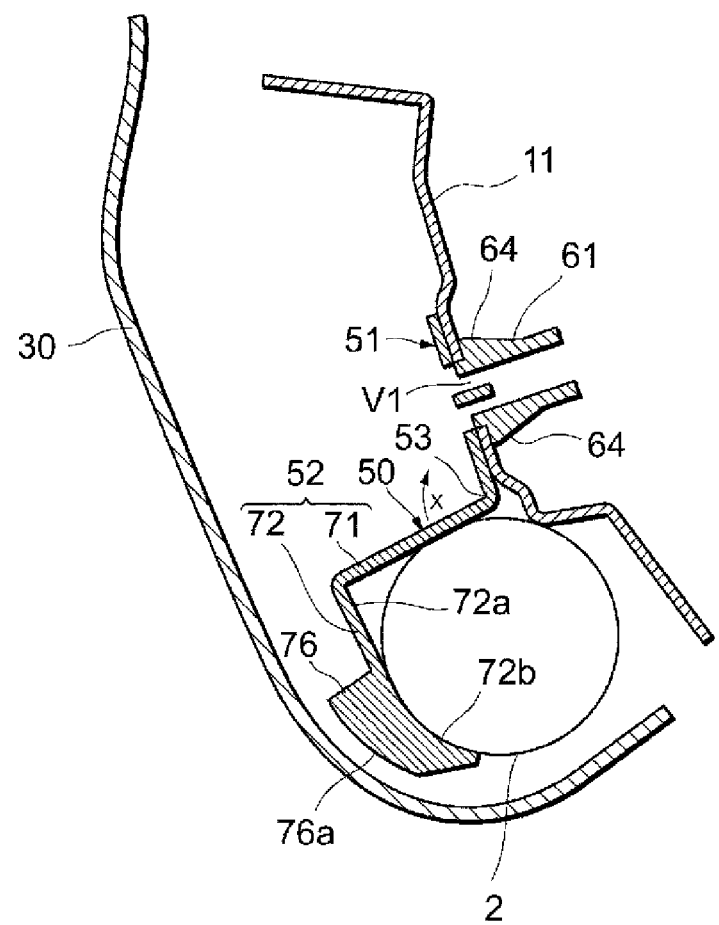
FIG. 4 is a cross-sectional view taken along line IV-IV in FIG. 2.
Figure 5:
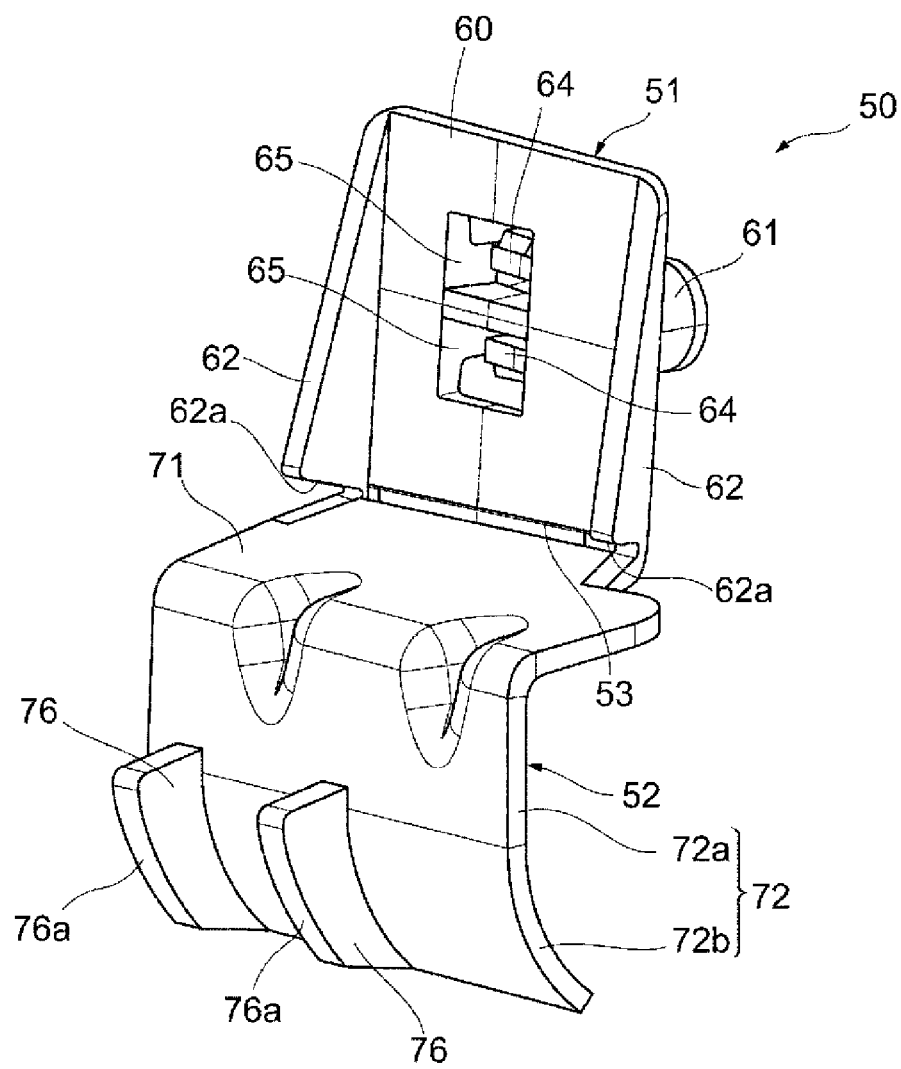
FIG. 5 is a perspective view illustrating an airbag deployment assistance member according to an embodiment.

Here, in the present embodiment, a cap 50 of which the details are illustrated in FIG. 5 to FIG. 7B is provided at a position illustrated in FIG. 4 located closer to the top sealing than the retaining point of the clip 31 illustrated in FIG. 3. The cap 50 is an airbag deployment assistance member that assists deployment of the curtain airbag 2, and as illustrated in FIG. 4, is arranged between the A-pillar 11 (the inner panel thereof) and the A-pillar trim 30. A larger part of the curtain airbag 2 in the folded state is surrounded by the A-pillar 11, the A-pillar trim 30, and the cap 50.

The cap 50 is formed from a thermoplastic elastomer and has predetermined rubber-like elasticity such that the cap is bent when pressed by an operator. Although various thermoplastic elastomers can be used, it is preferable to use olefins (TPO), and a combination of polypropylene and EPDM is a preferred example thereof. By using the cap 50 made from such a thermoplastic elastomer, the cap can be appropriately used in a wide range of temperatures (for example, −35° C. to 80° C.) under which the vehicle is used. The material of the cap 50 is not limited to a thermoplastic elastomer, and other resin materials can be also used.

As illustrated in FIG. 4 to FIG. 7B, the cap 50 includes an attachment portion 51 attached to the A-pillar 11 (the body of the vehicle V), a holding portion 52 that holds the curtain airbag 2 in the folded state extending from one end of the attachment portion 51 in an approximately L-shape, and a hinge portion 53 that connects one end of the attachment portion 51 and the holding portion 52.

As illustrated in FIG. 5 to FIG. 7B, the attachment portion 51 includes a tab-shaped base portion 60, a clip portion 61 that protrudes toward one side of the base portion 60, and flanges 62 that protrude toward the other side of the base portion 60. Referring to FIG. 4, the protruding direction of the clip portion 61 and the flanges 62 has such a relation with the A-pillar trim 30 that the clip portion 61 protrudes toward a side opposite the A-pillar trim 30 whereas the flanges 62 protrude toward the A-pillar trim 30.

As illustrated in FIG. 5 to FIG. 7B, the clip portion 61 is a cylindrical portion having an oblong cross-sectional shape and has claw-shaped locking portions 64 which are formed on the upper and lower portions thereof. As illustrated in FIG. 4, the clip portion 61 is detachably inserted into an attachment hole V1 of the A-pillar 11. When the base portion 60 is inserted until the base portion 60 makes surface-contact with the A-pillar 11, the locking portions 64 are locked at the hole edge of the attachment hole V1. As a result, the cap 50 is attached to the A-pillar 11. The locking portions 64 are bent in a direction in which the locking portions 64 approach each other when inserted, and are then returned to their original shape due to elastic deformation whereby the locking portions 64 are locked at the hole edge of the attachment hole V1. When this locking is released, an operator may access the locking portions 64 through upper and lower through-holes 65 of the base portion 60 from the interior side and bend the locking portions 64 in a direction in which the locking portions 64 approach each other.

As illustrated in FIG. 5 to FIG. 7B, the flanges 62 (protruding portions) are formed so as to be erected from both side portions of the base portion 60. The position of the flanges 62 has such a relation with the curtain airbag 2 and the vehicle V that the flanges 62 are disposed to be spaced from each other in an extension direction (longitudinal direction) of the curtain airbag 2 and are disposed on the front and rear sides of the vehicle V as seen from the clip portion 61. The flanges 62 are formed in such a triangular shape that the base thereof increases as it advances toward the holding portion 52 when seen in a side view. Bottom surfaces 62a of the flanges 62 are separated from the outer surface of the holding portion 52, and a triangular space is formed between the bottom surfaces and the outer surface of the holding portion 52 in a side view. During deployment (hereinafter referred to as airbag deployment) of the curtain airbag 2, the outer surface of the holding portion 52 makes contact with the bottom surfaces 62a of the flanges 62 so as to cover the triangular space in a side view, which will be described in detail later.

As illustrated in FIG. 4, the holding portion 52 includes a first portion 71 and a second portion 72, and the first and second portions 71 and 72 generally have an approximately L-shaped cross-sectional shape and cooperate to hold the curtain airbag 2 in the folded state on the inner side thereof. The first portion 71 is formed as a vertical wall portion that extends from one end of the base portion 60 toward the A-pillar trim 30. The second portion 72 extends downward from an end of the first portion 71 close to the A-pillar trim 30 and is disposed between the curtain airbag 2 and the A-pillar trim 30. The second portion 72 has a vertical wall portion 72a and a curved wall portion 72b, one end of the vertical wall portion 72a is connected to an end of the first portion 71 close to the A-pillar trim 30, and the other end of the vertical wall portion 72a is connected to one end of the curved wall portion 72b. The curved wall portion 72b is curved so as to extend toward the outer lower side, and the other end of the curved wall portion 72b faces the A-pillar trim 30 with a gap disposed therebetween.

Figure 6A:
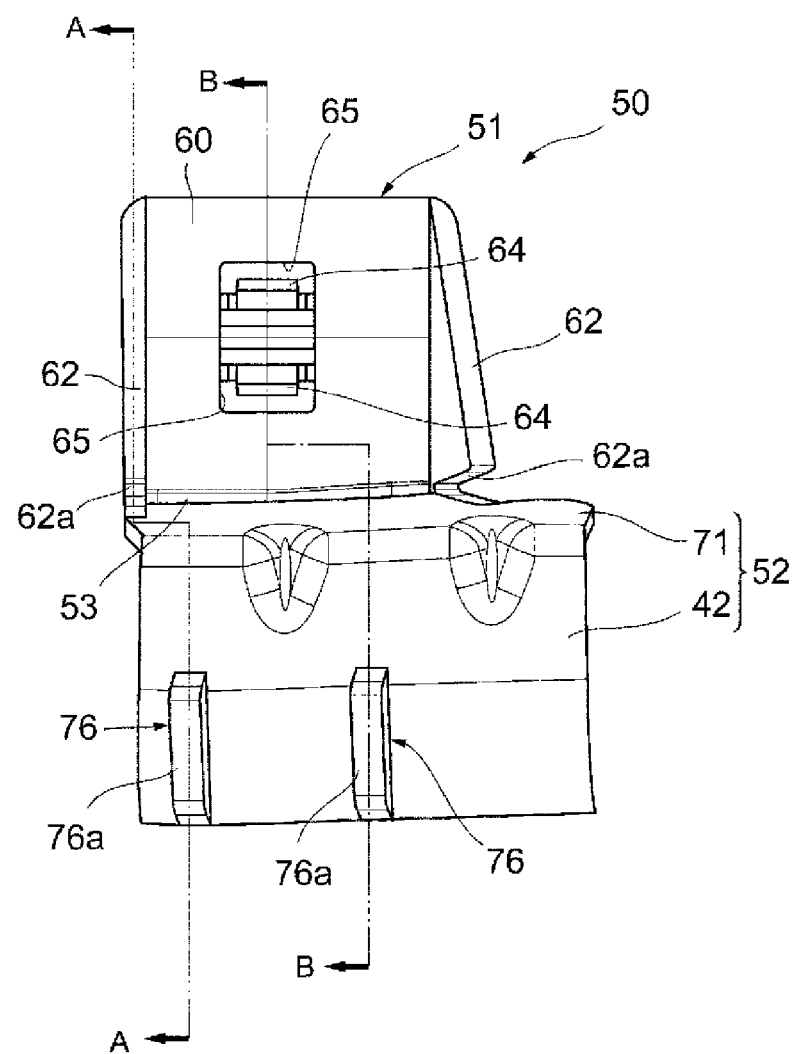
FIG. 6A is a front view of the airbag deployment assistance member of FIG. 5.
Figure 6B:
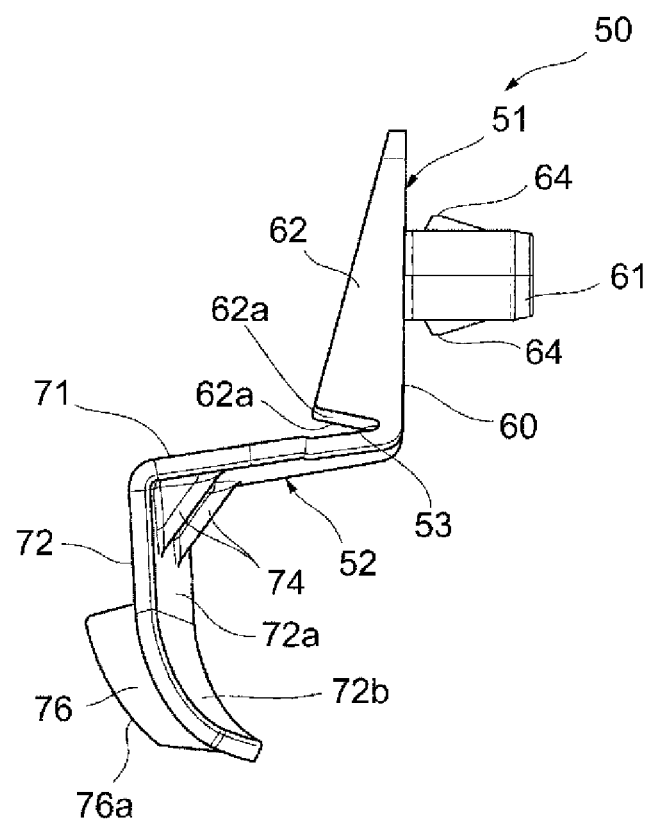
FIG. 6B is a right side view of the airbag deployment assistance member of FIG. 5.
Figure 7A:
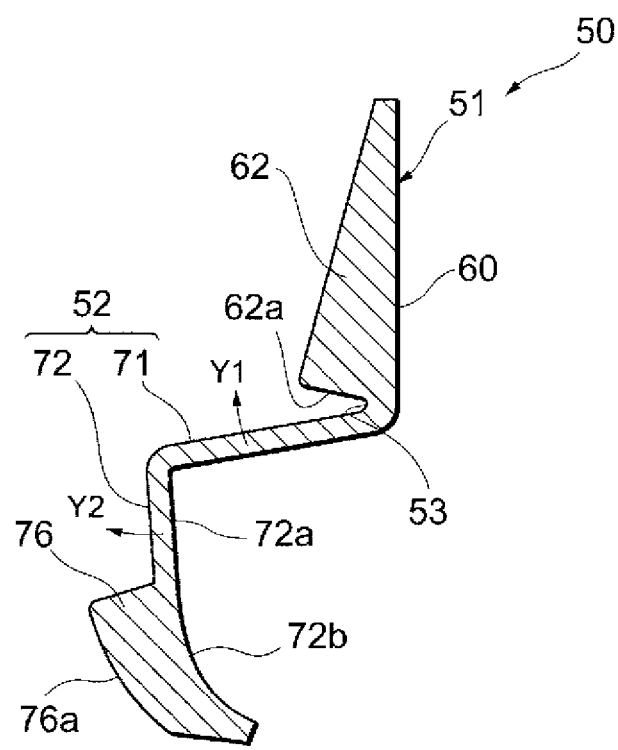
FIG. 7A is a cross-sectional view taken along line A-A in FIG. 6A.
Figure 7B:
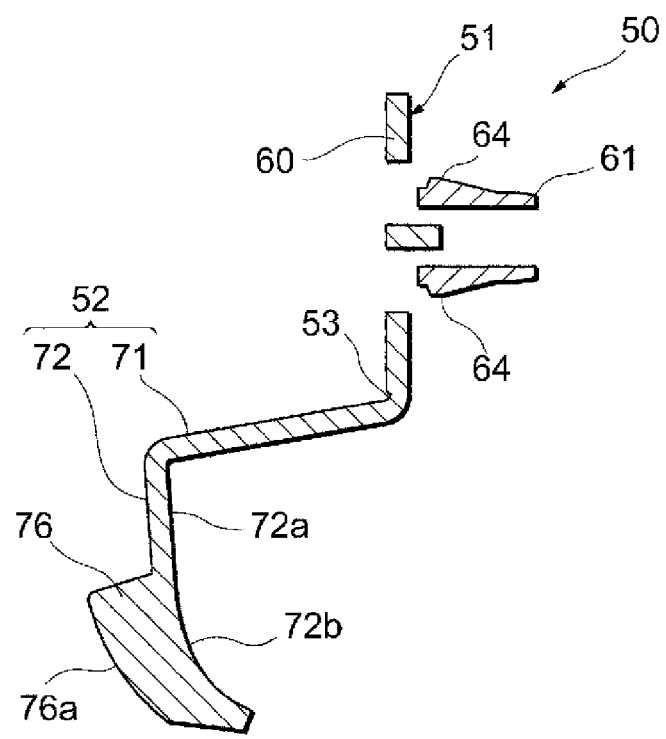
FIG. 7B is a cross-sectional view taken along line B-B in FIG. 6A.

Beads 74 that connect inner portions of both the first and second portions 71 and 72 are formed in a portion (bent portion) that connects the first and second portions 71 and 72 as illustrated in FIG. 6B. The beads 74 are formed by depressing the outer surface of the holding portion 52 so that the beads 74 become ribs protruding toward the inner side of the holding portion 52 (see FIG. 6A). The beads 74 are spaced from each other in the extension direction of the curtain airbag 2 and are disposed at such positions that the deployment of the curtain airbag 2 is not obstructed. With such beads 74, the rigidity of the portion connecting the first and second portions 71 and 72 is enhanced.

Force transmitting portions 76 that transmit the deployment force of the curtain airbag 2 to the A-pillar trim 30 are formed on the outer surface of the second portion 72. The force transmitting portions 76 are projections that protrude from the outer surface of the second portion 72 toward the A-pillar trim 30, and end surfaces 76a close to the A-pillar trim 30 are curved similarly to the curved wall portion 72b. The force transmitting portions 76 are disposed to be spaced from each other in the extension direction of the curtain airbag 2 and are disposed on the front and rear sides of the vehicle V when seen from the clip portion 61 similarly to the flanges 62. During airbag deployment, the force transmitting portions 76 make contact with the A-pillar trim 30 to press and open the A-pillar trim 30, which will be described in detail later. The force transmitting portions 76 may be in contact with the A-pillar trim 30 before the airbag deployment as long as the force transmitting portions 76 can make contact with the A-pillar trim 30 during the airbag deployment.

The hinge portion 53 is formed by thinning a portion (bent portion) that connects the lower end of the base portion 60 and one end of the first portion 71. Specifically, the hinge portion 53 is formed by forming the lower end of the base portion 60 close to the A-pillar trim 30 in a groove shape which extends in the longitudinal direction of the curtain airbag 2. Due to this, the hinge portion 53 has lower rigidity than the attachment portion 51 and the holding portion 52. As a result, when the deployment force of the curtain airbag 2 is applied during the airbag deployment, the holding portion 52 rotates about the hinge portion 53 as indicated by arrow X in FIG. 4. The rotation continues until the outer surface of the first portion 71 of the holding portion 52 makes contact with the bottom surfaces 62a of the flanges 62. That is, the contact restricts further rotation of the holding portion 52 (see FIGS. 8A to 8C).

Here, a deformation mode of the cap 50 during the airbag deployment will be described. The cap 50 is deformed roughly in two steps during the airbag deployment. First, in the first step, as indicated by arrow Y1 in FIG. 7A, the entire holding portion 52 rotates about the hinge portion 53 until the first portion 71 makes contact with the bottom surfaces 62a of the flanges 62 by the deployment force of the curtain airbag 2. The deformation in the first step does not depend on the output of the inflator 3. In the second step, as indicated by arrow Y2 in FIG. 7A, the second portion 72 is deformed so as to be open in relation to the first portion 71. That is, the second portion 72 is deformed so that an interior angle between the first portion 71 and the second portion 72 increases. In this manner, the cap 50 of the present embodiment is configured such that the holding portion 52 rotates first during the airbag deployment so that the first portion 71 makes contact with the flanges 62, and then, the second portion 72 is allowed to be deformed so as to be open.

Figure 8A:
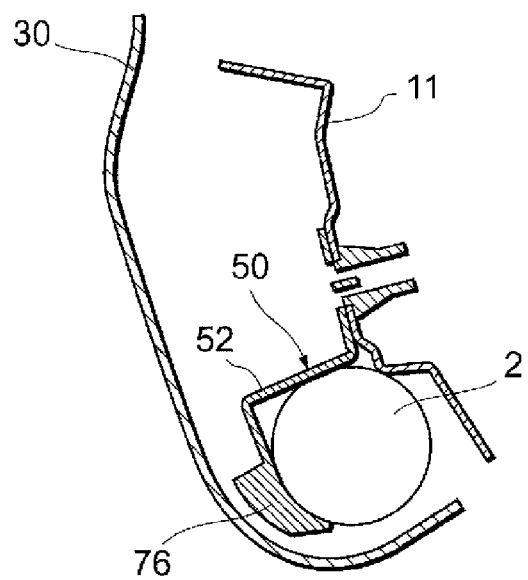
FIG. 8A is the cross-sectional view taken along line IV-IV in FIG. 2 and is a view illustrating the state before airbag deployment among the views illustrating, with time, how the airbag deployment assistance member of FIG. 5 assists the deployment of a curtain airbag during airbag deployment.

Next, how the cap 50 assists deployment of the curtain airbag 2 during airbag deployment will be described with reference to FIGS. 8A to 8C. FIG. 8A illustrates the state before airbag deployment, FIG. 8B illustrates the initial state of airbag deployment, and FIG. 8C illustrates the initial state of airbag deployment where the airbag deployment progresses slightly further than the state of FIG. 8B.

In the state of FIG. 8A, when inflation gas is supplied to the curtain airbag 2, the curtain airbag 2 starts inflating to press the holding portion 52 of the cap 50. Then, as illustrated in FIG. 8B, the holding portion 52 of the cap 50 rotates in the direction indicated by arrow Y1 about the hinge portion 53. With this rotation, the force transmitting portions 76 make contact with the A-pillar trim 30 to press and open the A-pillar trim 30. In the state of FIG. 8B, although the curtain airbag 2 being gradually deployed in the direction indicated by arrow Z has not reached the A-pillar trim 30, the deployment force of the curtain airbag 2 is transmitted from the force transmitting portions 76 to the A-pillar trim 30, and a gap G between the A-pillar 11 and the A-pillar trim 30 starts becoming wider.

Figure 8B:
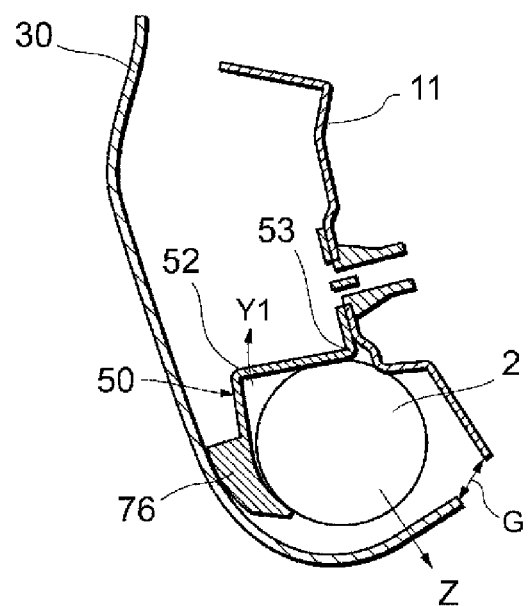
FIG. 8B is a view illustrating the initial state of airbag deployment later than the state of FIG. 8A.
Figure 8C:
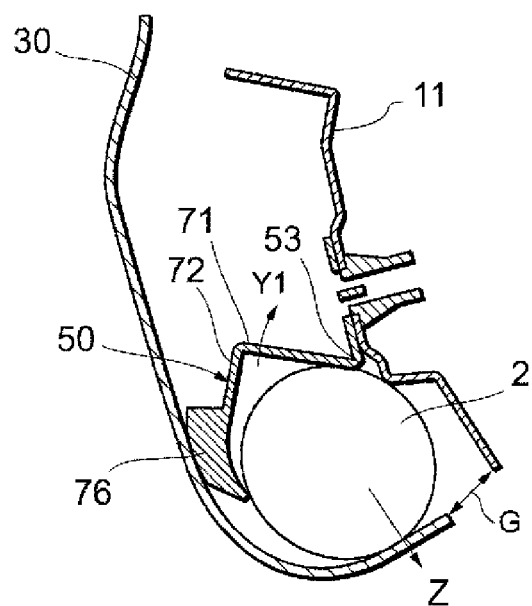
FIG. 8C is a view illustrating the initial state of airbag deployment where the airbag deployment progresses slightly further than the state of FIG. 8B.

When the inflation of the curtain airbag 2 progresses from the state of FIG. 8B to the state of FIG. 8C, rotation of the holding portion 52 in the direction Y1 about the hinge portion 53 progresses and the force transmitting portions 76 presses the A-pillar trim 30 so that the gap G becomes wider. In the state of FIG. 8C, the first portion 71 makes contact with the flanges 62, whereby the rotation of the holding portion 52 in the direction Y1 is restricted and the first step of deformation of the cap 50 ends. Moreover, in the state of FIG. 8C, the curtain airbag 2 reaches the A-pillar trim 30.

After that, when the inflation of the curtain airbag 2 progresses and the curtain airbag 2 starts pressing the A-pillar trim 30 directly, the gap G is further increased. In this case, the second step of deformation of the cap 50 occurs, and the second portion 72 is open in relation to the first portion 71. However, since the beads 74 are formed between the first portion 71 and the second portion 72, the deformation of the second portion 72 which is gradually open is suppressed to some extent. Although the curtain airbag 2 is gradually deployed toward the vehicle interior side from the gap G due to the repulsive force received from the holding portion 52 of the cap 50, the deployment direction is oriented in an intended direction indicated by arrow Z by the holding portion 52.

According to the cap 50 of the present embodiment described above, since the rotation of the holding portion 52 during the airbag deployment is restricted at a predetermined position, it is possible to prevent a variation in rotation amount of the cap 50 during the airbag deployment. Moreover, since the deformation of the second portion 72 is allowed after the rotation of the holding portion 52 is restricted, the curtain airbag 2 can be deployed in a state where there is no variation in rotation amount of the cap 50.

If the second portion 72 is open before the rotation of the holding portion 52 is restricted unlike the present embodiment, the curtain airbag 2 is deployed in a state where the rotation amount is not constant. Due to this, the deployment direction becomes unstable. Moreover, sufficient deployment force of the curtain airbag 2 is not transmitted to the force transmitting portions 76. As a result, the A-pillar trim 30 is not opened sufficiently, and the deployment direction becomes unstable.

In contrast, in the present embodiment, as described above, since the cap 50 as the airbag deployment assistance member is configured to be deformed in two steps during the airbag deployment, it is possible to suppress troubles resulting from a variation in the rotation amount and to stabilize the deployment direction of the curtain airbag 2.

In particular, the two flanges 62 are the positions at which the rotation of the holding portion 52 is restricted. Due to this, it is possible to restrict the rotation of the holding portion 52 in a well-balanced manner as compared to when the rotation is restricted at one position. Moreover, when only one flange is disposed, the attachment portion 51 may rotate about the clip portion 61 during the airbag deployment. However, since the two flanges 62 are disposed with the clip portion 61 interposed, it is possible to suppress such rotation of the attachment portion 51 in a well-balanced manner. Since rotation is restricted and suppressed in such a well-balanced manner, the stability of the deployment direction of the curtain airbag 2 is further improved.

Further, although the second portion 72 is deformed so as to be open with the second step of deformation of the cap 50, this deformation is suppressed as much as possible by the beads 74. Thus, the cap 50 can restrict the deployment direction of the curtain airbag 2 to deploy the curtain airbag 2 in an intended direction.

Moreover, since the force transmitting portions 76 are formed in the cap 50, it is possible to open the A-pillar trim 30 while gradually smoothing the force applied to the A-pillar trim 30 with time during the airbag deployment. As a result, since the load and impact acting on the A-pillar trim 30 is relieved, it is possible to prevent breakage (damage) of the A-pillar trim 30.

As described above, according to the present embodiment, since the force applied to the A-pillar trim 30 by the deployed curtain airbag 2 is appropriately distributed during the airbag deployment, the A-pillar trim 30 is not deformed inappropriately. As a result, since the A-pillar trim 30 is deformed, as designed, during the airbag deployment, it is possible to prevent the deployed curtain airbag 2 from being caught at the A-pillar trim 30 and to prevent an associated delay in deployment of the curtain airbag 2.

Hereinabove, embodiments of the present invention have been described by referring to specific examples. The specific examples are examples for describing the present invention, and it is not intended to limit the present invention to the embodiments only. That is, these specific examples may be appropriately modified in design by those skilled in the art, and these modifications fall within the scope of the present invention as long as the modifications include the features of the present invention. The respective elements included in the specific examples described above and the arrangement, materials, conditions, shapes, sizes, number, and the like are not limited to those illustrated but can be modified appropriately.

For example, a portion close to the A-pillar trim 30, of the attachment portion 51 that restricts the rotation of the holding portion 52, may be a protruding portion other than the flanges 62. Moreover, a protruding portion may be provided in the holding portion 52 rather than the attachment portion 51. In this case, the protruding portion of the holding portion 52 may make contact with a portion (for example, the base portion 60) of the attachment portion 51 close to the A-pillar trim 30, whereby the rotation of the holding portion 52 during airbag deployment is restricted.

The curtain airbag 2 may be arranged in the vehicle V in a state of being covered by a cover. In this case, the cap 50 may be provided in a portion which is not covered by the cover.

Moreover, when the caps 50 are provided on the front and rear sides of the retaining point (the position of the clip 31) of the A-pillar trim 30, respectively, the stability of the airbag deployment direction may be improved more effectively.

(First Modification)

Figure 9:
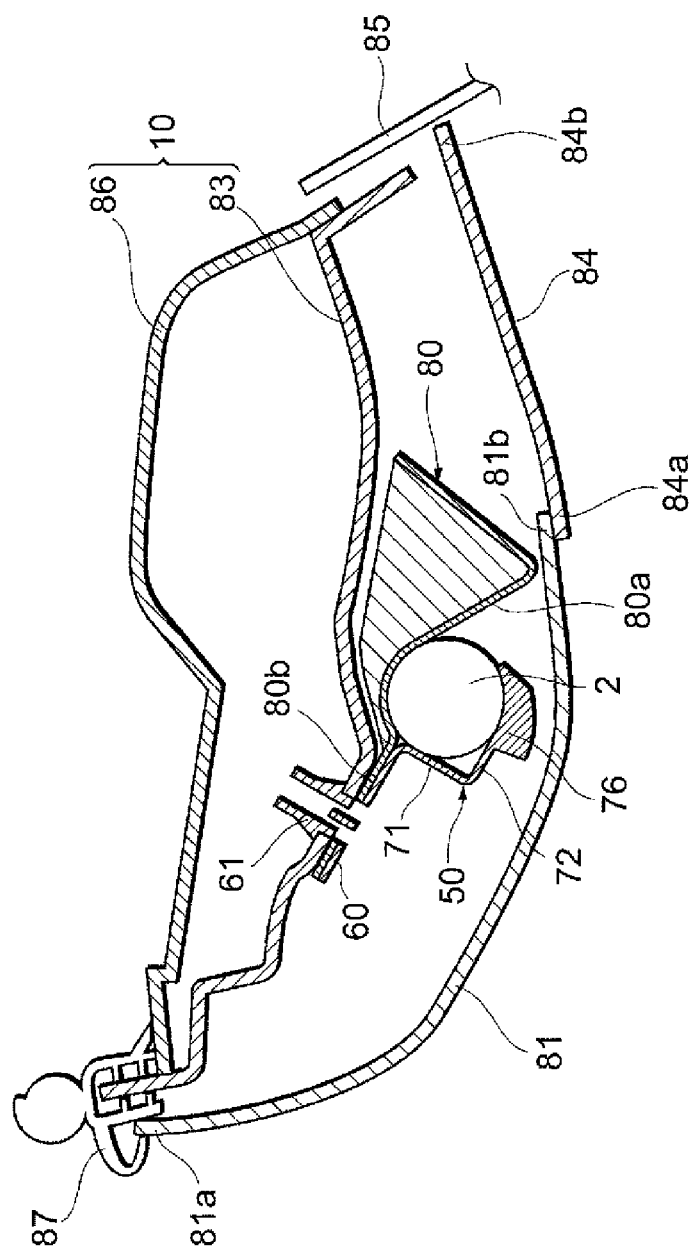
FIG. 9 is a cross-sectional view illustrating an arrangement structure of an airbag device according to a first modification.

In a first modification illustrated in FIG. 9, the cap 50 which is an airbag deployment assistance member is provided at a position corresponding to the roof side rail 10. Since the function of the cap 50 as the airbag deployment assistance member (the principle and operation of being deformed in two steps during airbag deployment) is the same as that of the embodiment described above, detailed description thereof will not be provided, and the same members will be denoted by the same reference numerals.

As illustrated in FIG. 9, the cap 50 is arranged between the roof side rail 10 (the body of the vehicle V) and a roof side inner garnish 81.

The roof side rail 10 is formed by bonding an inner panel 83 and an outer panel 86, for example. A resin cover 80 is provided between the inner panel 83 and the cap 50, and the curtain airbag 2 in the folded state is surrounded by the resin cover 80, the cap 50, and the roof side inner garnish 81.

The resin cover 80 has a guide portion 80a which is formed on a surface close to the roof side inner garnish 81 so as to guide the deployment direction of the curtain airbag 2 during airbag deployment. Moreover, the resin cover 80 has an attachment portion 80b which is sandwiched between the inner panel 83 and the base portion 60 of the cap 50. The resin cover 80 having such a configuration is configured to be retained in the inner panel 83 together with the cap 50. Specifically, when the cap 50 is attached to the inner panel 83 with the clip portion 61 interposed, the attachment portion 80b of the resin cover 80 is interposed between the inner panel 83 and the base portion 60 of the cap 50, whereby the cap 50 and the resin cover 80 are retained in the inner panel 83. The resin cover 80 and the cap 50 may be formed integrally during molding, and the resin cover 80 may not be provided.

The roof side inner garnish 81 is an interior garnish that covers the roof side rail 10 from the interior side together with a rail garnish 84. The roof side inner garnish 81 has one end 81a which is supported by a weather strip 87 and the other end 81b which is close to the rail garnish 84 and which is supported by an end portion 84a on the inner side in the vehicle-width direction of the rail garnish 84. The end portion 84b on the outer side in the vehicle-width direction of the rail garnish 84 is disposed near a side window glass 85. During airbag deployment, the other end 81b of the roof side inner garnish 81 is pressed by the curtain airbag 2, a gap is formed between the roof side inner garnish 81 and the rail garnish 84, and the curtain airbag 2 is deployed downward from this gap.

The positional relation and action of the first and second portions 71 and 72 of the cap 50 in relation to the roof side inner garnish 81 are the same as those in relation to the A-pillar trim 30 in the embodiment described above. For example, the first portion 71 extends from one end of the base portion 60 toward the roof side inner garnish 81, and the second portion 72 extends from the end of the first portion 71 close to the roof side inner garnish 81 toward the outer side in the vehicle-width direction. Moreover, the force transmitting portion 76 of the second portion 72 is configured so as to transmit the deployment force of the curtain airbag 2 to the roof side inner garnish 81.

Thus, also in the first modification, the cap 50 can be deformed in two steps during the airbag deployment, whereby the deployment direction of the curtain airbag 2 can be stabilized. Moreover, since the load and impact acting on the roof side inner garnish 81 during the airbag deployment is relieved by the force transmitting portion 76, it is possible to prevent breakage of the roof side inner garnish 81 and the rail garnish 84. Further, since the roof side inner garnish 81 is deformed, as designed, during the airbag deployment, it is possible to prevent a delay in deployment of the curtain airbag 2.

The first modification is ideal for sports vehicles, but the vehicle type is not limited.

(Second Modification)

Figure 10:
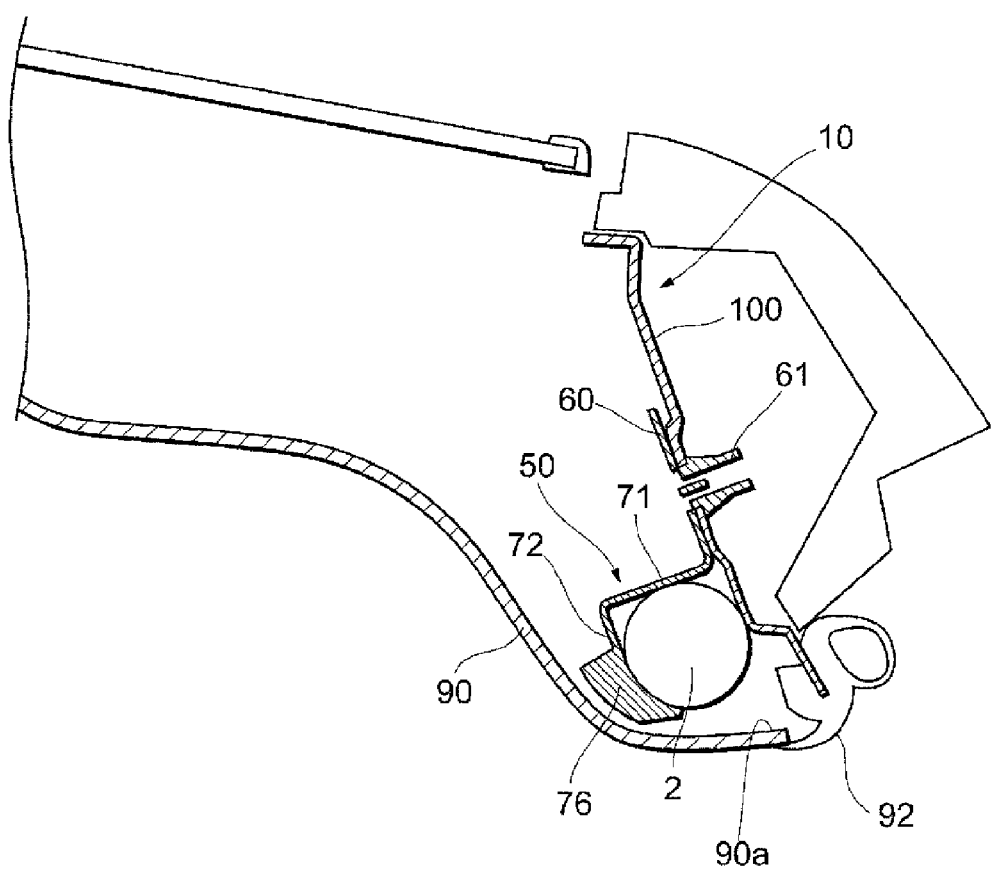
FIG. 10 is a cross-sectional view illustrating an arrangement structure of an airbag device according to a second modification.
Figure 11:
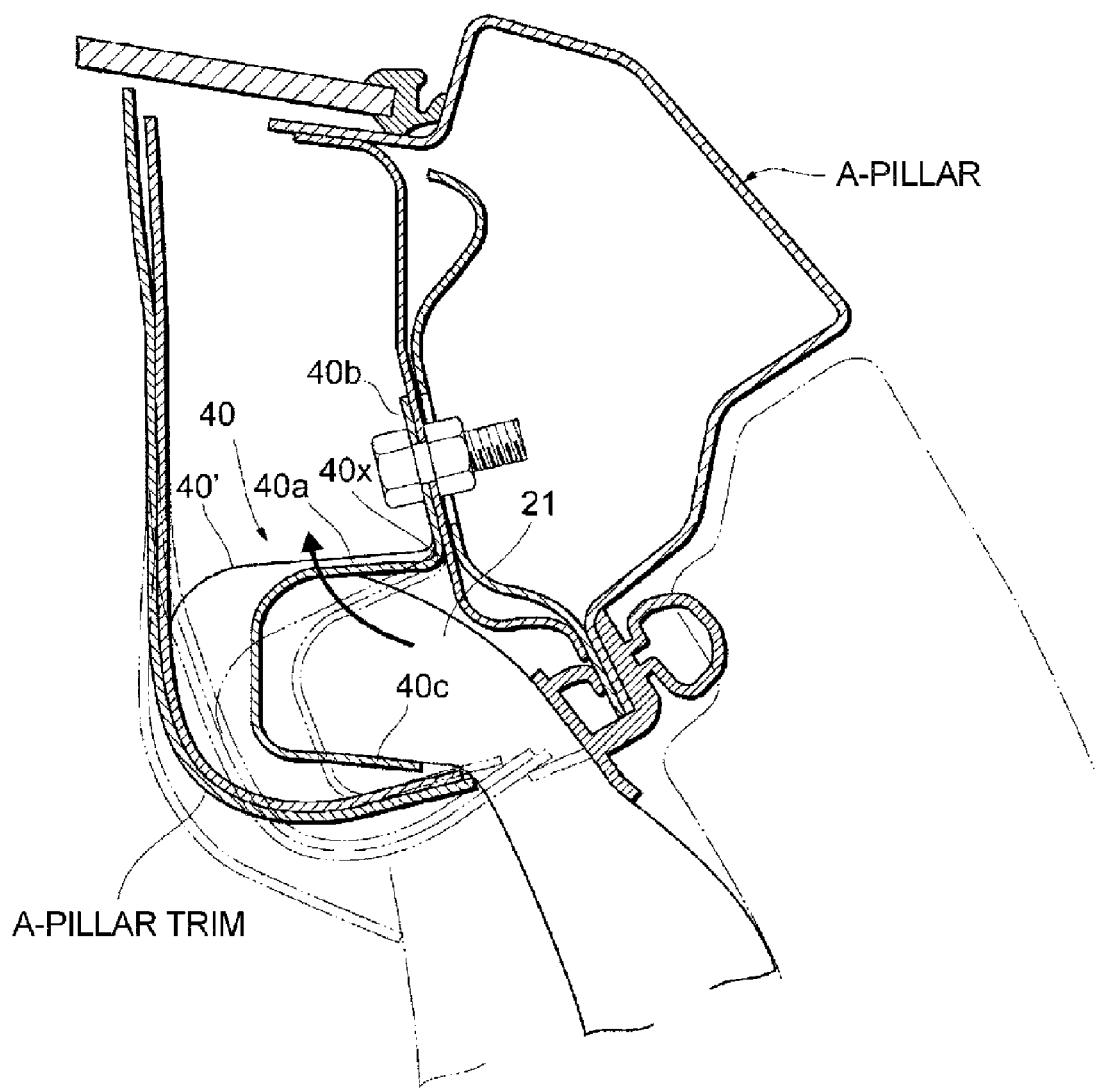
FIG. 11 is a cross-sectional view illustrating a conventional airbag deployment assistance member together with a curtain airbag and a vehicle structure.

In a second modification illustrated in FIG. 10, the cap 50 is provided at a position corresponding to the roof side rail 10 similarly to the first modification. The second modification is ideal for sunroof vehicles (panoramic sunroof vehicles) and normal vehicles, but the vehicle type is not limited as described above. A window glass is not depicted in FIG. 10. Moreover, since the function of the cap 50 as the airbag deployment assistance member (the principle and operation of being deformed in two steps during airbag deployment) is the same as that of the embodiment described above, detailed description thereof will not be provided, and the same members will be denoted by the same reference numerals.

As illustrated in FIG. 10, the cap 50 is arranged between the roof side rail 10 (the body of the vehicle V) and a roof headlining 90 (roof side inner garnish). More specifically, the cap 50 is attached to an inner panel 100 (roof-side body panel) of the roof side rail 10 by the clip 61 so as to cover the curtain airbag 2 in the folded state together with the inner panel 100 and the roof headlining 90.

The roof headlining 90 is an interior garnish arranged in a region which extends from the ceiling portion of a vehicle cabin to the roof side rail 10. One end 90a of the roof headlining 90 is supported by a weather strip 92. One end 90a of the roof headlining 90 is pressed by the curtain airbag 2 during the airbag deployment, a gap is formed between the roof headlining 90 and the weather strip 92, and the curtain airbag 2 is deployed downward from this gap.

The positional relation and action of the first and second portions 71 and 72 of the cap 50 in relation to the roof headlining 90 are the same as those in relation to the A-pillar trim 30 in the embodiment described above. For example, the first portion 71 extends from one end of the base portion 60 toward the roof headlining 90, and the second portion 72 extends from the end of the first portion 71 close to the roof headlining 90 toward the outer side in the vehicle-width direction. Moreover, the force transmitting portion 76 of the second portion 72 is configured so as to transmit the deployment force of the curtain airbag 2 to the roof headlining 90.

Thus, in the second modification, the cap 50 can be deformed in two steps during the airbag deployment, whereby the deployment direction of the curtain airbag 2 can be stabilized. Moreover, since the load and impact acting on the roof headlining 90 during the airbag deployment is relieved by the force transmitting portion 76, it is possible to prevent breakage of the roof headlining 90. Further, since the roof headlining 90 is deformed, as designed, during the airbag deployment, it is possible to prevent a delay in deployment of the curtain airbag 2.

The same resin cover as the resin cover 80 of the first modification may be provided, and in this case, the resin cover may be formed to be integrated with or be separated from the cap 50.

What is claimed is:

1. An airbag deployment assistance member for a vehicle and comprising:
   an attachment portion configured to be attached to a body of the vehicle;
   a holding portion having a first portion that extends from one end of the attachment portion toward an interior garnish of the vehicle, and a second portion that extends from an end portion of the first portion close to the interior garnish and holds a curtain airbag in a folded state on the inner side together with the first portion; and
   a hinge portion that connects one end of the attachment portion and the first portion, wherein
   during deployment of the curtain airbag, all of the holding portion being configured to rotate about the hinge portion by deployment force of the curtain airbag until an outer portion of the first portion makes contact with a portion of the attachment portion close to the interior garnish, and after such contact, the second portion being configured to be deformed so as to be open in relation to the first portion, wherein the portion of the attachment portion close to the interior garnish with which the outer portion of the first portion makes contact is a protruding portion that protrudes toward the interior garnish.

2. The airbag deployment assistance member according to claim 1, wherein at least two protruding portions are provided in an extension direction of the curtain airbag.

3. The airbag deployment assistance member according to claim 2, wherein the attachment portion has a clip portion that protrudes toward a side opposite the interior garnish, the clip portion being detachably attachable to the body of the vehicle, and
   the at least two protruding portions being disposed on front and rear sides of the vehicle when seen from the clip portion.

4. The airbag deployment assistance member according to claim 1, wherein the hinge portion is formed by thinning a portion that connects one end of the attachment portion and the first portion.

5. The airbag deployment assistance member according to claim 1, wherein a force transmitting portion that transmits the deployment force of the curtain airbag to the interior garnish so as to open the interior garnish is provided in the second portion.

6. The airbag deployment assistance member according to claim 1, wherein a bead connects inner portions of the first and second portions and is formed in a portion that connects the first and second portions.

7. The airbag deployment assistance member according to claim 1, wherein the interior garnish is a pillar trim.

8. The airbag deployment assistance member according to claim 1, wherein the interior garnish is a roof side inner garnish.

9. A curtain airbag device comprising the airbag deployment assistance member according to claim 1.

* * * * *